(12) United States Patent
Fujisawa

(10) Patent No.: US 11,743,394 B2
(45) Date of Patent: Aug. 29, 2023

(54) INFORMATION PROCESSING APPARATUS THAT TRANSMITS APPARATUS MANAGEMENT INFORMATION TO AN EXTERNAL SERVER, METHOD, AND PROGRAM STORAGE MEDIUM

(71) Applicant: CANON KABUSHIKI KAISHA, Tokyo (JP)

(72) Inventor: Minoru Fujisawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/734,437

(22) Filed: May 2, 2022

(65) Prior Publication Data

US 2022/0368804 A1    Nov. 17, 2022

(30) Foreign Application Priority Data

May 14, 2021    (JP) ................................. 2021-082336

(51) Int. Cl.
*H04N 1/00* (2006.01)

(52) U.S. Cl.
CPC ..... *H04N 1/00061* (2013.01); *H04N 1/00344* (2013.01); *H04N 1/00896* (2013.01); *H04N 1/00973* (2013.01)

(58) Field of Classification Search
None
See application file for complete search history.

(56) References Cited

U.S. PATENT DOCUMENTS

| | | | | |
|---|---|---|---|---|
| 2012/0182572 | A1* | 7/2012 | Kaneko | G06F 3/123 358/1.15 |
| 2013/0129354 | A1* | 5/2013 | Tanaka | H04B 10/27 398/66 |
| 2016/0337535 | A1* | 11/2016 | Ishida | H04N 1/00344 |
| 2018/0115654 | A1* | 4/2018 | Imai | H04N 1/00087 |
| 2020/0267278 | A1* | 8/2020 | Mochizuki | H04N 1/32673 |

(Continued)

FOREIGN PATENT DOCUMENTS

| | | |
|---|---|---|
| JP | H0626392 B2 | 4/1994 |
| JP | 2018014591 A | 1/2018 |

*Primary Examiner* — Henok Shiferaw
(74) *Attorney, Agent, or Firm* — ROSSI, KIMMS & McDOWELL LLP

(57) ABSTRACT

An information processing apparatus configured to transmit apparatus management information used in the management of the own apparatus to an external server is provided with a first communication unit; a second communication unit that is different from the first communication unit; a transmission unit configured to externally transmit apparatus management information via the first communication unit when in a regular power mode in which the information processing apparatus operates using a first power source configured to receive a power supply from outside the apparatus; and a control unit configured to perform, in a case that power supply to the information processing apparatus by the first power supply has been stopped, control such that power is supplied to the second communication unit by a second power source inside the apparatus after this power supply has been stopped, and the apparatus management information is externally transmitted via the second communication unit.

11 Claims, 9 Drawing Sheets

(56) References Cited

U.S. PATENT DOCUMENTS

2020/0358919 A1* 11/2020 Shimamura ........ H04N 1/00888
2020/0366805 A1* 11/2020 Aoki .................. H04N 1/00244
2021/0286569 A1* 9/2021 Tsunekawa ........ H04N 1/00214

* cited by examiner

INFORMATION PROCESSING APPARATUS THAT TRANSMITS APPARATUS MANAGEMENT INFORMATION TO AN EXTERNAL SERVER, METHOD, AND PROGRAM STORAGE MEDIUM

BACKGROUND OF THE INVENTION

Field of the Invention

The present invention relates to an information processing apparatus, a method, and a program storage medium.

Description of Related Art

In information processing apparatuses including image forming apparatuses such as multifunction peripherals, printers, and the like (also referred to below as MFPs), a system that remotely monitors and manages an MFP based on apparatus management information that has been transmitted to an external management server from the MFP is common. In this type of system, apparatus management information, which includes, for example, the configuration information and each type of status information for the apparatus, is periodically transmitted to a management server from the MFP. For example, in the case in which a payment service is in operation for the user of the MFP, apparatus management information indicating the number of prints, copies, and the like (counter information) is transmitted to a management server on the cloud, and the user is billed according to predetermined conditions based on this information.

In contrast, in the field of IoT, LPWA (Low Power Wide Area) standards have been gaining attention as a communication method that realizes telecommunication with reduced electricity consumption. For example, a Low Power Wide Area wireless system that uses a frequency in the 920 MHz range such as LoRaWAN, Sigfox, or the like, can be given as an example of a communication standard belonging to LPWA. Although communication standards belonging to LPWA have the limitation of low speed and the communicable data size (payload) being small, they are used as low energy communication terminals.

For example, Japanese Unexamined Patent Application, First Publication No. 2018-14591 discloses a communication system that transmits data between apparatuses by using a LoRaWAN method. In addition, Japanese Examined Patent Application, Second Publication No. H6-26392 provides a system in which, in order for the necessary data to be continuously saved even if a situation occurs in which the power for the terminal is turned off while the communication terminal is performing communication, power supply to the CPU and the data buffer memory are continued.

Generally, it is thought that when an MFP is in use, the user turns on the power, and when the MFP is not in use, the user would like to disconnect the external power supply, and turn the MFP off. In addition, in the case in which the office or the like in which the MFP is located has a long vacation or a power outage planned, the MFP will be put into a turned-off state rather than an energy saving mode. In addition, the MFP will also be turned off according to the user's convenience when they would like to discontinue their use of the MFP.

However, the object of turning off the MFP and the schedule for the next time that it will be turned on are both decided at the convenience of the user's side, and these conditions are not known by the management server's side.

For example, in the case in which the MFP has been turned off due to damage, when it has been turned off, the apparatus management information cannot be used, and therefore, there are cases in which services for the user in maintenance services for the MFP cannot be efficiently performed. Therefore, a system is required that is capable of continuing to send notifications to external units about the apparatus management information after the power has been turned off for the apparatus, even when the apparatus is in a turned-off state.

SUMMARY OF THE INVENTION

One embodiment of the present invention is an information processing apparatus configured to transmit apparatus management information used to manage the own apparatus to an external server. The information processing apparatus comprising: a first communication unit; a second communication unit that is different from the first communication unit; a memory storing instructions; and a processor executing instruction causing the information processing apparatus to: externally transmit the apparatus management information via the first communication unit when in a regular power mode in which the information processing apparatus operates using a first power source configured to receive a power supply from outside of the apparatus; and perform control, in a case that power supply to the information processing apparatus by the first power supply has been stopped, such that power is supplied to the second communication unit by a second power source inside the apparatus after the power supply has stopped, and the apparatus management information is externally transmitted via the second communication unit.

Further features of the present invention will become apparent from the following description of exemplary embodiments with reference to the attached drawings.

BRIEF DESCRIPTION OF THE DRAWINGS

FIG. 7 is a flowchart showing an example of the initialization processing that is performed by the control unit when the power source for the MFP is turned on.

DETAILED DESCRIPTION OF THE INVENTION

Below, modes for implementing the present invention will be described with reference to the attached drawings and the like However, the necessary elements of the present invention are not limited to the entirety of the characteristics that are explained in the following embodiments.

First Embodiment

Figure 1:
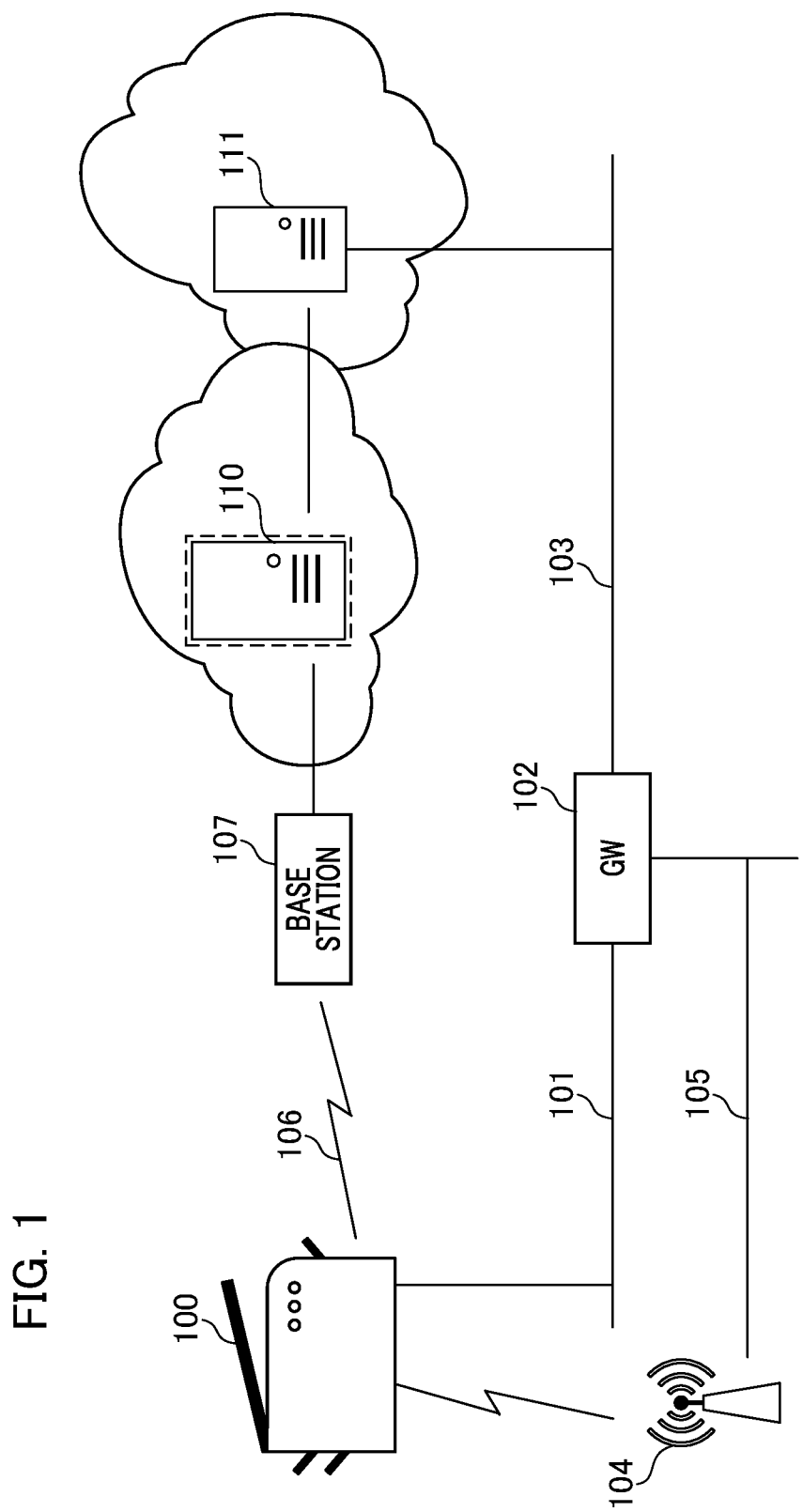
FIG. 1 is a diagram showing an example of a configuration of a network system in the first embodiment.

FIG. 1 is a diagram showing an example of a configuration of a network system in the first embodiment. A network system is provided with an MFP 100, which is an example of an information processing apparatus, and an apparatus management server 111, which manages the MFP 100. The MFP 100 and the apparatus management server 111 are connected through a plurality of communication interfaces. FIG. 1 shows an example in which one MFP 100 is included in the network system. However, a plurality of MFPs 100 may be included in the network.

The MFP 100 is, for example, an image forming apparatus such as a multifunction peripheral, a printer, or the like, and is connected to a LAN 101, which is an intranet, through a router (not shown). The MFP 100 receives print commands from a PC (not shown) that is connected to the same network, and executes print processing and scanned image transmission. In addition, the MFP 100 is provided with a wireless LAN, and is also connected to a wireless LAN access point (also referred to as an AP below) 104 in wireless infrastructure mode. The MFP 100 is thereby also able to communicate using a WLAN 105 via the AP 104.

A LAN 101 and a wireless LAN 105 are connected to an external network (internet 103), which is connected to the apparatus management server 111, via a gateway 102. The gateway 102 functions as a firewall configured to control whether or not communication is possible between the LAN 101 or the wireless LAN 105 and the internet 103. Note that in the present embodiment, communication between the MFP 100 and the apparatus management server 111 via at least one of the LAN 101 and the wireless LAN 105 is authorized by the gateway 102.

In addition, the MFP 100 has the function of communicating with a base station 107 based on LPWA standards via a wide area wireless communication network 106 using a wireless controller 214 to be described below. The wireless controller 214 of the MFP 100 communicates with the base station 107 using communication protocols that conform with LPWA standards. Note that the control for communication with the base station 107 by the wireless controller 214 is executed independently from communication control by the above gateway 102.

In addition, the base station 107 is connected to the apparatus management server 111 via the cloud server 110. The cloud server 110 is a server apparatus configured to manage the communication data based on LPWA standards that the base station 107 has received from the MFP 100 on a cloud. The cloud server 110 stores and manages the LPWA standards communication data by associating it with an identifier that identifies the wireless controller 214. In addition, the cloud server 110 provides the apparatus management server 111 in the preceding stage with functions such as parsing the LPWA standards communication data, and the like.

The apparatus management server 111 stores and manages the apparatus management information that has been collected from the MFP on the cloud, and is a server apparatus that provides each type of service. In this context, the apparatus management information is generated on the MFP 100, and is information that is used in the management of the MFP 100 by the apparatus management server 111. The apparatus management information includes at least one of information indicating the state of the MFP 100, information indicating the operation history of the MFP 100, or information indicating the remaining amount of consumable products that are used by the MFP 100. For example, the apparatus management information includes information about the remaining amount of consumable products such as toner or the like, information about states such as operator call or error conditions such as a lack of paper, counter information about the output paper, or the like. The above counter information about the output paper is information indicating the operation history of the MFP 100, and is used in order to manage the billing for the MFP 100.

The apparatus management server 111 stores the above apparatus management information by associating it with a serial number (SN) that uniquely specifies the MFP 100. In this context, the apparatus management server 111 directly acquires the apparatus management information from the MFP 100 through the internet 103 according to an IP protocol such as HTTP and the like. In addition, the apparatus management server 111 acquires the apparatus management information from LPWA standards communication data through the base station 107 or the cloud server 110.

Figure 2:
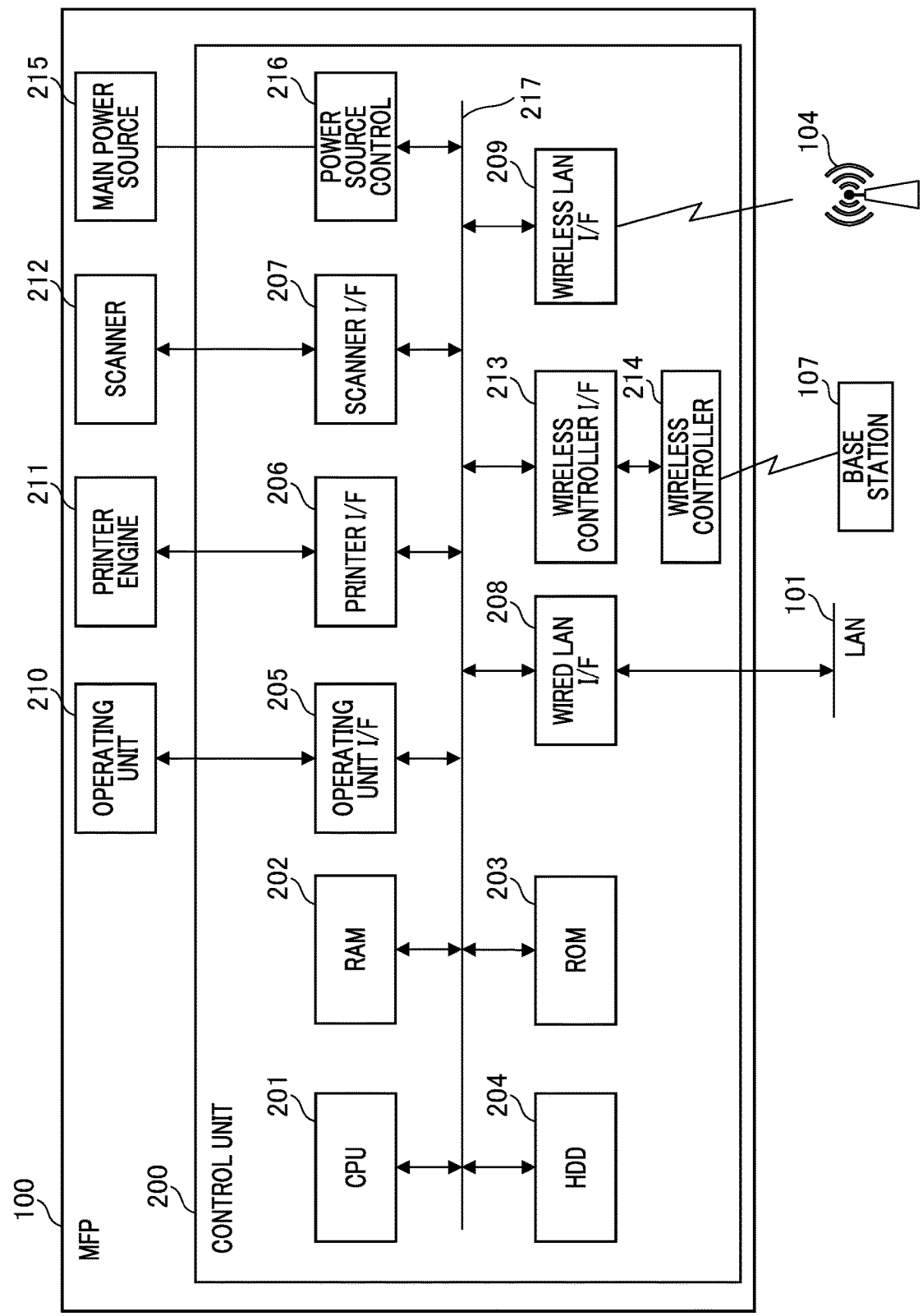
FIG. 2 is a diagram showing an example of a hardware configuration of the MFP.

FIG. 2 is a diagram showing an example of a hardware configuration of the MFP 100.

The MFP 100 is provided with a control unit 200, an operating unit 210, a printer engine 211, a scanner 212, and a main power source 215. The control unit 200 is electrically connected to the operating unit 210, the printer engine 211, the scanner 212, and the main power source 215.

The control unit 200 has a CPU 201, a RAM 202, a ROM 203, an HDD 204, an operating unit I/F 205, a printer I/F 206, and a scanner I/F 207. In addition, the control unit 200 has a wired LAN I/F 208, a wireless LAN I/F 209, a wireless controller I/F 213, and a power source control 216. The above elements of the control unit 200 are connected to each other via a bus 217. In addition, the control unit 200 further has a wireless controller 214 that has been connected to the wireless controller I/F 213.

Note that CPU is an abbreviation of Central Processing Unit, and ROM is an abbreviation of Read Only Memory. RAM is an abbreviation of Random Access Memory, and HDD is an abbreviation of Hard Disk Drive. USB is an abbreviation of Universal Serial Bus.

The CPU 201 is a processor that performs each type of arithmetic processing according to a program that has been saved on the RAM 202, the ROM 203, or the HDD 204. The CPU 201 performs each type of control such as communication control and image processing, along with controlling the overall operation of the MFP 100 by executing a program. In this way, the hardware such as the CPU 201, the RAM 202, the ROM 203, and the HDD 204 configure a what is termed a computer.

The RAM 202 is used as a temporary storage area (working memory) for when the CPU 201 performs each type of arithmetic processing. The RAM 202 is configured by an NVRAM, which is able to retain the stored contents even after the power is switched off, and which stores settings values and the like, a DRAM, in which the stored contents are deleted after the power is switched off, and the like. The ROM 203 is a nonvolatile storage area, and saves a program such as for example, a BIOS, or the like.

The HDD 204 is a non-volatile, large capacity storage medium that stores each type of user data, programs, and the like. In addition, the HDD 204 also stores history information for the jobs executed by the MFP 100, such as printing, copying and the like, counter information for the output paper, which serves as the operations history, and the like. Note that a Solid State Drive (SSD) may be used instead of the HDD 204.

The operating unit I/F 205 connects the bus 217 and the operating unit 210, and is an interface that receives inputs from the operating unit 210. In this context, the operating unit 210 is configured as, for example, an input/output apparatus on which a touch panel has been mounted on the display unit thereof.

The operating unit I/F 205 outputs the input information from the operating unit 210 to the bus 217 along with, for example, displaying operation screen data that has been received from the bus 217 on the display unit of the operating unit 210. In this way, the user commands for the MFP 100 and the presentation of the information from the MFP 100 are performed via the operating unit 210.

The printer I/F 206 is an interface that connects the printer engine 211 and the bus 217. The printer engine 211 performs image forming on the sheets of paper that have been fed from the paper feed cassette (not shown) using known electrophotography methods based on the image data that has been received from the printer I/F 206. Specifically, the printer engine 211 transfers images onto the sheets by executing electrification, exposure, photographic development, transfer, and fixation processes. Note that the update processing for the above counter information is executed according to the paper discharge operations of the printer engine 211.

In addition, AC power and DC power that have been generated by the power source control 216 are supplied to the printer engine 211. The printer engine 211 executes each type of process by using this supplied power.

The scanner I/F 207 is an interface that connects the scanner 212 and the bus 217. The scanner 212 reads original images on sheets and then image processes and outputs the image data that has been obtained by reading the original. The image data that has been generated by the scanner 212 may also be printed by the printer engine 211, stored on the HDD 204, or transmitted to an external apparatus via the wired LAN I/F 208 or the wireless LAN I/F 209.

The wired LAN I/F 208 is an interface for connecting the LAN 101 and the bus 217 using a wire conforming to Ethernet standards. The wireless LAN PT 209 is an interface for performing wireless communication with the AP 104 conforming to IEEE802.11 standards. The CPU 201 is able to perform data transmission/reception to and from an external apparatus via the wired LAN I/F 208 or the wireless LAN I/F 209. In addition, in a regular power mode to be described below, the CPU 201 is able to transmit the apparatus management information to the apparatus management server 111 through the internet 103 via the wired LAN I/F 208 or the wireless LAN I/F 209.

The wireless controller 214 performs communication between the base station 107 conforming to LPWA communication standards based on transmission and reception commands that have been received from the CPU 201 via the wireless controller I/F 213.

The main power source 215 manages the function of receiving the power supply from a commercial power source (not shown). The main power source 215 is provided with a part in which the MFP100 receives a power supply that is external to the apparatus, that is, an inlet. A power source cable inlet plug (not shown) is detachably connected to the inlet of the main power source 215. When the power source cable inlet plug is inserted into the inlet of the main power source 215, and the outlet plug on the other end of this power source cable is connected to a commercial power electrical socket (outlet), the main power source 215 is able to receive a power supply from the commercial power source. The operation mode in which the main power source 215 receives a power supply from the commercial power source is also referred to as regular power mode.

The power source control 216 is provided with an AC/DC convertor and an AC/AC converter, generates direct current power and alternating current power that is suitable for the operations of each unit from the alternating current power that is supplied from the commercial power source, and supplies power to each unit of the MFP 100. In addition, the power source control 216 performs control for switching the power, and the power supply to each unit of the MFP on and off.

In this context, when the MFP 100 receives a shutdown operation in regular power mode, the MFP 100 transitions into a turned-off state (shutdown state). The power source control 216 of the MFP 100 that has transitioned into the turned-off state supplies power to only one portion of the circuits such as the hardware switches for turning the power on and off, without supplying power to each unit such as the printer engine 211, the CPU, and the like. The power source control 216 performs restoration processing toward regular power mode when it detects that the hardware switch has been pressed in the turned-off state.

Now, the system that makes it possible to transmit communication data in the case in which the MFP 100 has transitioned into the turned-off state by performing LPWA communication using an internally provided storage battery will be described. The MFP 100 is thereby able to externally send the apparatus management information for the apparatus even after it has transitioned into the turned-off state, and in the case in which, after having transitioned into the turned-off state, the inlet plug has been removed from the MFP 100, and it is in a state in which it cannot receive an external power supply.

Figure 3:
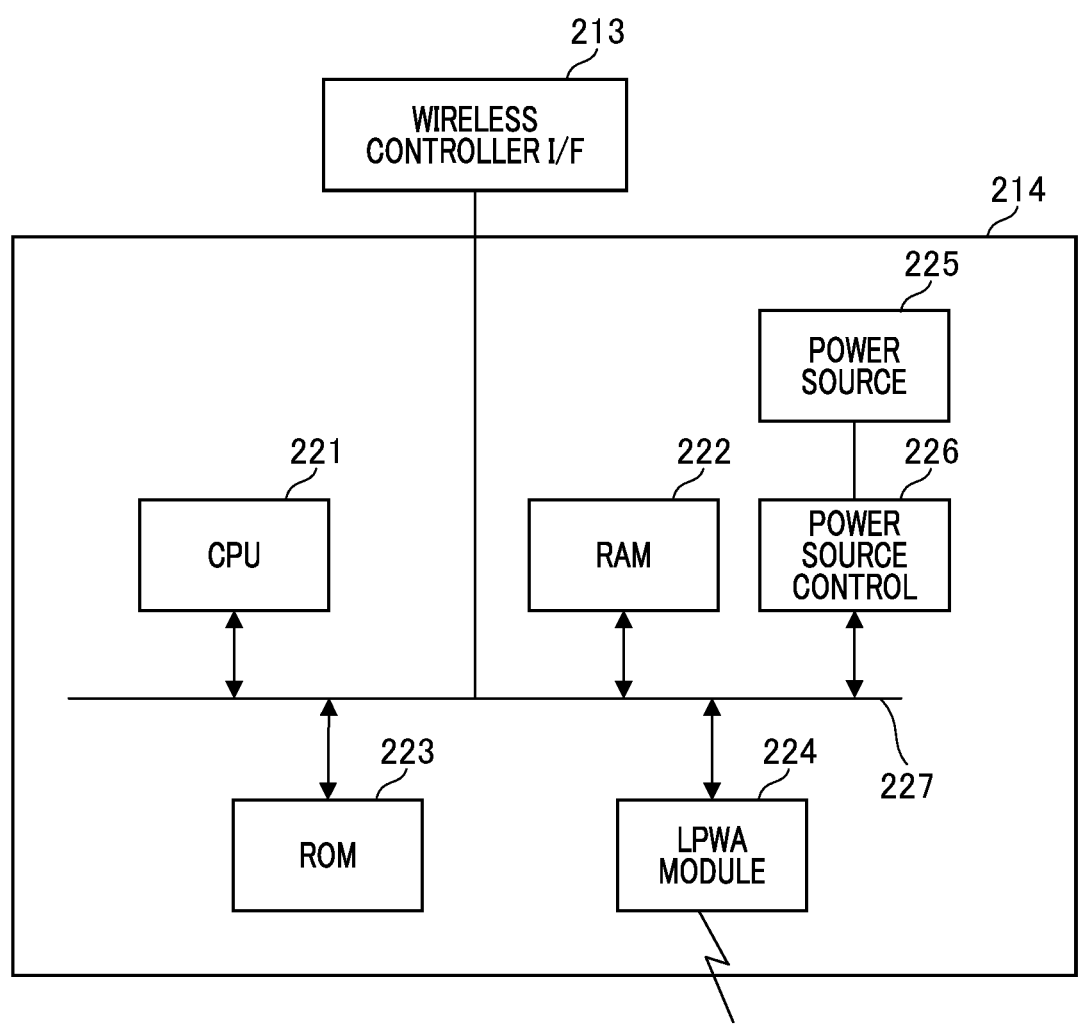
FIG. 3 is a diagram showing an example of a hardware configuration of the wireless controller in FIG. 2.

FIG. 3 is a diagram showing an example of a hardware configuration of the wireless controller in FIG. 2. The wireless controller 214 has a CPU 221, a RAM 222, a ROM 223, an LPWA module 224, and a power source control 226. The above elements of the wireless controller 214 are connected to each other via a bus 227. In addition, the power source control 226 is connected to the power source 225.

The CPU 221 performs control of the LPWA communication using the LPWA module 224, which includes a 920 MHz wireless antenna, by reading out and executing a control program that has been stored on the ROM 223 and that serves as a wireless controller. In this context, the control program that is read by the CPU 221 serves as the trigger for each type of command that has been received from the control unit 200 of the MFP 100 through the wireless controller I/F 213, and performs transmission and reception control based on LPWA standards. Note that the control program may also be configured so that the wireless controller 214 can independently perform LPWA communication without depending on communication commands from the control unit 200.

The RAM 222 is used as a main memory and work area of the CPU 221. In addition, the RAM 222 is also used as an area configured to temporarily store data frames that are the target of transmission and reception by the LPWA communications.

The power source 225 is a unit configured to receive the power that is necessary in order to operate the wireless controller 214. The power source 255 is, for example, a storage battery, and is configured so as to be able to supply power to each unit of the wireless controller 214 even in a state in which at least the power supply from the main power source 215 has been stopped. Note that the power that can be stored by the power source 225 may be obtained at the power supply from the main power source 215, or it may already have been stored by an external power supply method at the time of the installation of the MFP 100.

The power source control 226 handles the function of providing power from the power source 225 to each unit of the wireless controller 214. In addition, the power source control 226 switches the power supply source of the wireless controller 214 from the main power source 215 to the power source 225, which is internal to the wireless controller 214, when the MFP 100 receives a shutdown operation.

Figure 4:
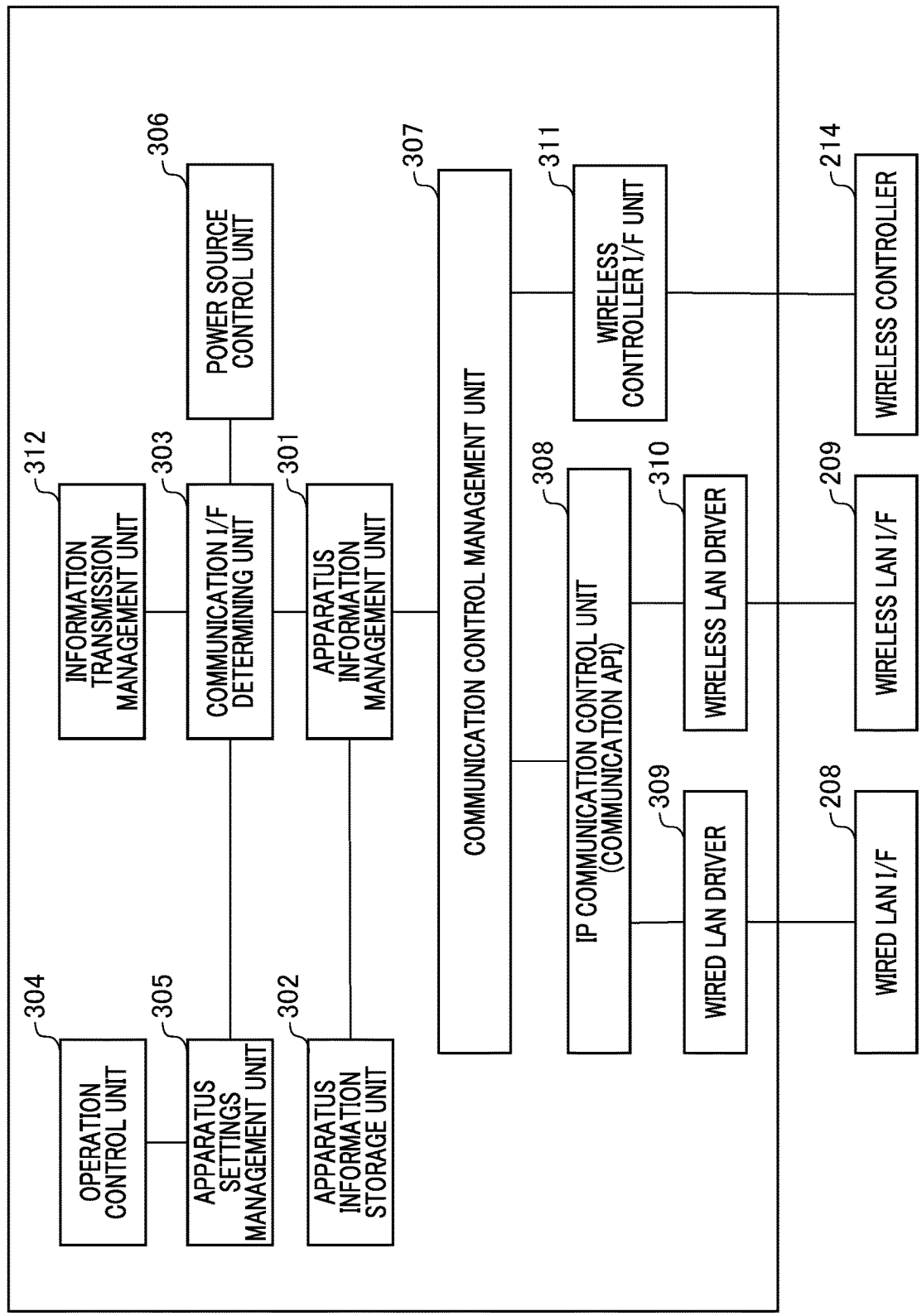
FIG. 4 is a diagram showing an example of a configuration for software that is executed by a control unit of the MFP.

FIG. 4 is a diagram showing an example of a configuration for software that is executed by the control unit 200 of the MFP 100. The functions of the software that is executed by the control unit 200 are realized by the CPU 201 reading and executing the program that has been stored on the ROM 203 or the HDD 204.

The software modules that are executed by the control unit 200 include an apparatus information management unit 301, an apparatus information storage unit 302, a communication I/F determining unit 303, an operation control unit 304, an apparatus settings management unit 305, and a power source control unit 306. Furthermore, the software modules include a communication control management unit 307, an IP communication control unit 308, a wired LAN driver 309, a wireless LAN driver 310, a wireless controller I/F unit 311, and an apparatus information transmission management unit 312.

The operation control unit 304 displays screen images for the user on the operating unit 210. In addition, the operation control unit 304 receives the input of settings values that have been associated with the configurational parts of the screen such as the operation buttons and the like, and execution commands for each type of processing when it detects that the operation buttons and the like that have been displayed on the screen of the operating unit 210 have been pressed (a user operation).

In contrast to storing the settings value data that has been received by the operation control unit 304 on the RAM 202, the apparatus settings management unit 305 performs a read out of the settings values based on requests from each unit. In the case in which, for example, some kind of apparatus setting has been changed by the user, when the operation control unit 304 detects the contents that have been input to the operating unit 210 by the user, the apparatus settings management unit 305 stores the input contents as settings values on the RAM 202 according to a request from the operation control unit 304.

In addition, the apparatus settings management unit 305 manages the valid/invalid settings of the wired LAN I/F 208 and the wireless LAN I/F 209 for the wireless controller, the settings for the interface that transmits the apparatus management information to the apparatus management server 111, and the like.

The apparatus information storage unit 302 saves the history of the status information for each functional job such as printing, copying, and the like, and the update data (counters indicating the number of prints and copies, and error information during the processing for each function). Note that the storage of the apparatus management information is allocated to one portion of the HDD 204 or the RAM 202 as the area configured to manage the apparatus information storage unit 302.

The communication I/F determining unit 303 determines the communication unit to be used in the communication of the apparatus management information according to a notification of the power state from the power source control unit 306 as well as reading out the setting values that have been stored by the apparatus settings management unit 305.

The power source control unit 306 manages the power supply state of the power source control 216. In addition, the power control unit 306 performs notifications and commands for each unit according to the power state while performing control of the shutdown and energy saving mode depending on the power state.

The apparatus information management unit 301 reads out the apparatus management information that has been stored by the apparatus information storage unit 302, and performs transmission commands for the apparatus management information to the communication control management unit 307. At this time, the apparatus information management unit 301 determines the apparatus management information to be transmitted based on the communication unit that has been determined by the communication I/F determining unit 303, and commands outputting to the communication control management unit 307.

In this context, the apparatus management information that is made the transmission target by the apparatus information management unit 301 has each type of status information such as the counter information, errors, and the like added to it, and includes at least the information related to the consumable products, and the information indicating the power source state of the MFP 100 (whether or not it is in the shutdown state).

The communication control management unit 307 performs communication control by using either of the IP communication by the wired LAN or the wireless LAN, or the LPWA communication according to the command from the apparatus information management unit 301.

The IP communication control unit 308 is a network library group that provides a communication API for performing IP communication. The IP communication control unit 308 determines the interface to be used for transmission and reception based on the contents that have been indicated through the communication control management unit 307 and the settings values that are stored by the apparatus settings management unit 305. In the present embodiment, the main line is allocated to the wired LAN, and the sub-line is allocated the wireless LAN, and the network that is shown in FIG. 1 is constructed.

The wired LAN driver 309 and the wireless LAN driver 310 are device drivers that control the hardware for both the wired LAN and the wireless LAN. As portions of an OS that integrally controls the control unit 200, these drivers configure a portion of a protocol stack for realizing IP communication.

The wireless controller I/F unit 311 is a library group that is called in the case in which the communication unit that has been indicated by the communication control management unit 307 is LPWA. The wireless controller I/F unit 311 is called by both the control unit 200 and the wireless controller 214 in order to receive data transmission and reception between the control unit 200 and the wireless controller 214, processing execution commands, and the processing results.

The apparatus information transmission management unit 312 manages the trigger event for transmitting each type of apparatus management information from inside the MFP 100 to the management server 111. This trigger event includes periodic transmission of the apparatus management information, the date and time information for transmitting transmission apparatus management information according to a pre-set schedule, and timer events. Note that the above schedule settings are performed by, for example, the manager of the MFP 100 or a serviceman who performs maintenance services.

Each type of error that can occur inside of the MFP 100 (jams that occur during printing, and abnormalities in the parts), and events that can occur irregularly, such as notifications about warnings about the remaining amount of consumable products such as tonner and the like, are further included as other trigger events.

The apparatus information transmission management unit 312 collects and manages the above plurality of trigger events. In addition, the apparatus information transmission management unit 312 is able to send information transmission requests to the communication I/F determining unit 303 at the appropriate timing.

Figure 5:
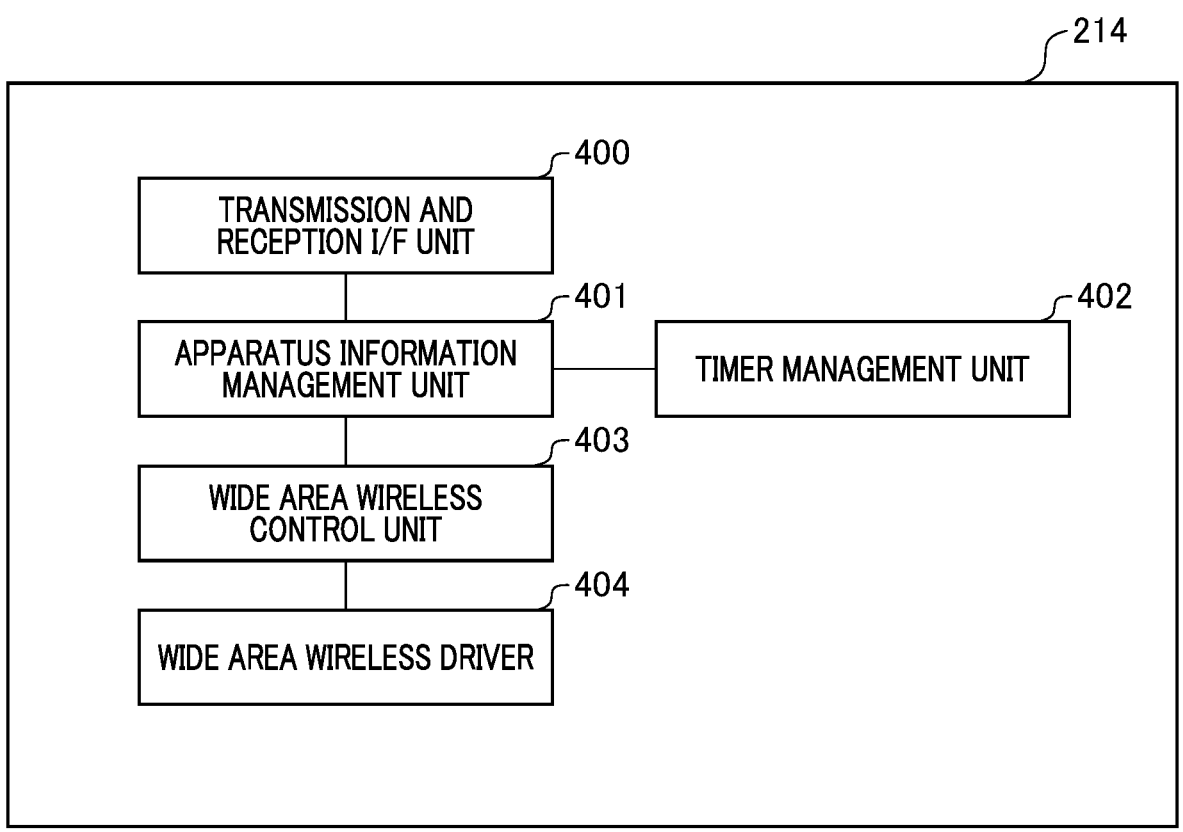
FIG. 5 is a diagram showing an example of a software configuration for the wireless controller.

FIG. 5 is a diagram showing an example of a software configuration of the wireless controller 214. The functions of the software that is executed by the wireless controller 214 are realized by the CPU 221 reading and executing the program that has been stored on the ROM 223.

The software modules that are executed by the wireless controller 214 include a transmission and reception I/F unit 400, an apparatus information management unit 401, a timer management unit 402, a wide area wireless control unit 403, and a wide area wireless driver 404.

The transmission and reception I/F unit 400 performs each type of request, notification, and response between the control unit 200 and the wireless controller 214, in the case in which the communication unit that has been selected from communication control management unit 307 via the wireless controller I/F unit 311 is LPWA.

The apparatus information management unit 401 performs commands to the wide area wireless control unit 403 at the actual time of communication along with performing management of the time intervals in which LPWA communication is performed and the suspension of communication by receiving requests and notifications that have been received from the transmission and reception I/F unit 400.

The timer management unit 402 provides timer events for managing the time intervals at which the apparatus information management unit 401 performs communication. The wide area wireless control unit 403 handles the functions of controlling the wide area wireless driver 404 based on transmission commands that have been received from the apparatus information management unit 401, and performing LPWA communication that used the LPWA module 224.

Figure 6:
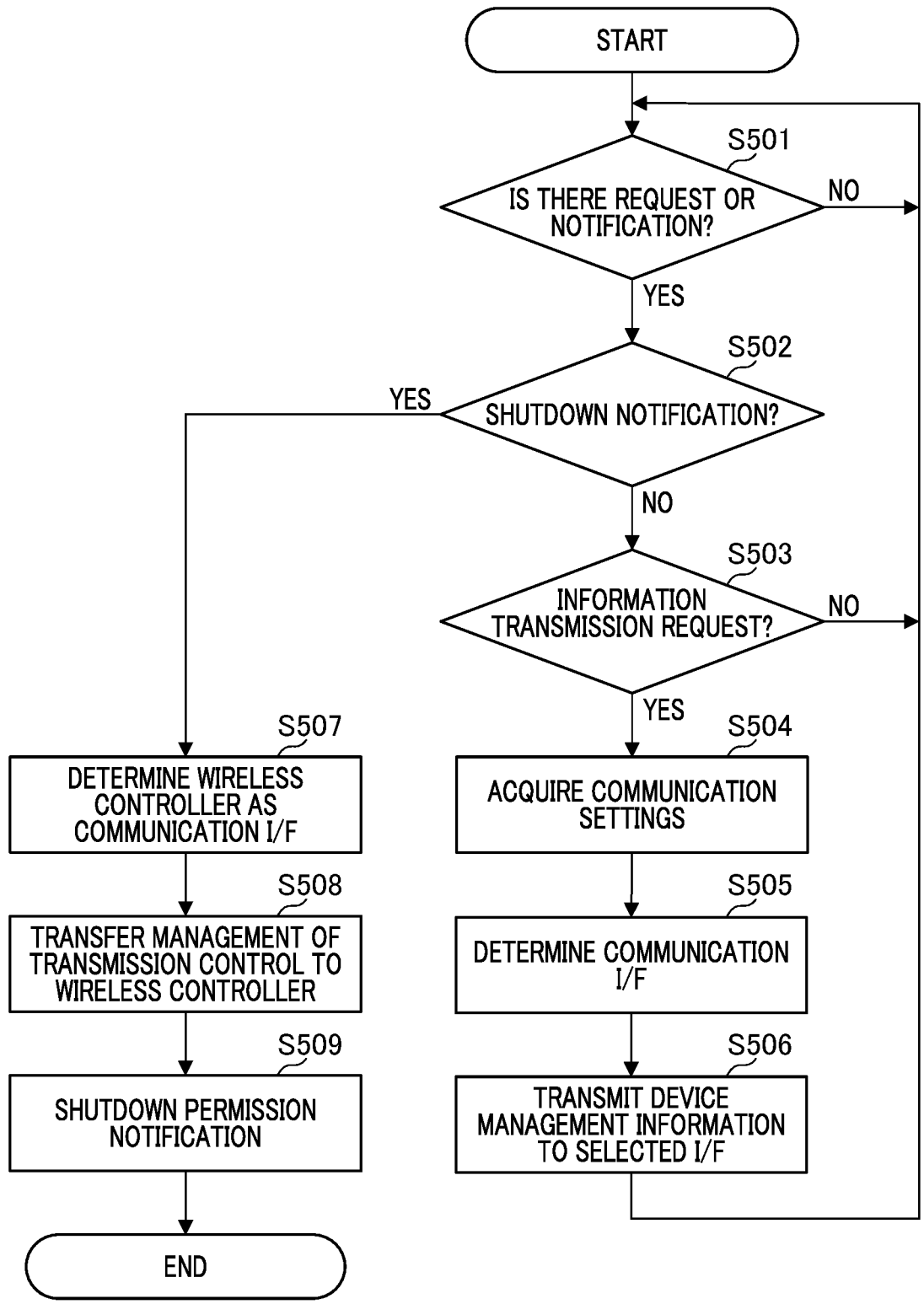
FIG. 6 is a flow chart showing an example of the basic operations for the information transmission of the MFP, and the shutdown processing that is performed by a control unit when the MFP is shut down.
Figure 7:
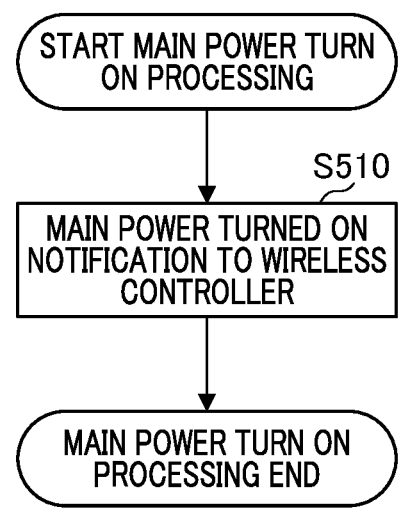

Next, the processing related to notifications about the control transfer for information transmission, and about the power state when the main power source of the MFP 100 transitions into regular power mode or the shutdown state will be explained with reference to FIGS. 6 and 7. Each operation (step) that is shown in the flowcharts in FIGS. 6, and 7 is realized by the CPU 201 calling and executing a program. Note that the data transmission and reception processing, shutdown processing, and the like are realized in cooperation with each unit. In addition, in order to make the subject of the processing clear, the processing will be explained with the software modules that are executed by the CPU 201 serving as the subjects.

FIG. 6 is a flow chart showing an example of the processing related to the basic operations of the information transmission for the MFP 100, and the shutdown processing that is performed by the control unit 200 when the MFP 100 is shut down.

In S501, the apparatus information transmission management unit 312 determines whether or not a trigger event such as request related to the start of information transmission processing, a shutdown notification, or the like has occurred. In the case in which a trigger event has occurred, the processing moves to S502. In contrast, in the event in which a trigger event has not occurred, the apparatus information transmission management unit 312 waits until a trigger event occurs.

In this context, in the case in which information transmission processing is started, the apparatus information transmission management unit 312 sends an information transmission request to the communication I/F determining unit 303. In addition, when the power source control unit 306 detects that the MFP 100 has been shut down via the power source control 216, a shutdown notification is output from the power source control unit 306.

In S502, the communication I/F determining unit 303 determines whether or not a shutdown notification for the MFP 100 has been received. In the case in which a shutdown notification has been received, the processing moves to S507. In contrast, in the case in which a shutdown notification has not been received, the processing moves to S503.

In S503, the communication I/F determining unit 303 determines whether or not an information transmission request has been received from the apparatus information transmission management unit 312. In the case in which an information transmission request has been received, the processing moves to S504. In contrast, in the case in which an information transmission request has not been received (S503 No), this event does not correspond to a shutdown notification or an information transmission request, and becomes an irregular event that cannot normally occur. Due to this, in the case of S503 No, the communication I/F determining unit 303 ignores this event, and the processing returns to S501 in order to wait for the next event.

In S504, the communication I/F determining unit 303 acquires the selected settings for the interface to be used for the information transmission from the apparatus settings management unit 305.

In S505, the communication I/F determining unit 303 determines the interface to be used for the transmission from among the wired LAN I/F 208, the wireless LAN I/F 209, and the wireless controller 214, based on the selected settings that were acquired in S504.

In S506, the communication I/F determining unit 303 sends a command to the apparatus information management unit 301 to transmit the apparatus management information by using the interface that was determined in S505.

When the apparatus information management unit 301 receives the above command from the communication I/F determining unit 303, it reads out the apparatus management information that has been stored on the apparatus information storage unit 302. Then, the apparatus information management unit 301 transmits the apparatus management information via the communication control management unit 307 by using the interface that has been determined. After this, the processing returns to S501.

S507 is the processing for the case in which a shutdown notification has been received. Although both the wired LAN I/F 208 and the wireless LAN I/F 209 become unusable when the power to the MFP 100 is turned off due to a shutdown, the wireless controller 214, which can be driven by the storage battery, is able to perform communication. Due to this, in S507, the communication IF determining unit 303 determines that all subsequent communication of apparatus management information will be performed using the wireless controller 214.

In S508, the communication I/F determining unit 303 notifies the apparatus information management unit 301 that the main power source is in a shutdown state. In addition, the communication I/F determining unit 303 sends a command to the apparatus information management unit 301 to transfer management of the control for information transmission after shutdown to the wireless controller 214.

When the apparatus information management unit 301 receives the above shutdown state notification and the management transfer command for communication control, it commands the communication control management unit 307 to perform all subsequent transmission of apparatus management information using the wireless controller 214, along with notifying it about the shutdown state of the main power source. In addition, the apparatus information management unit 301 reads out the apparatus management information from the apparatus information storage unit 302, and transmits the apparatus management information to the communication control management unit 307.

Upon receiving the above command and notification from the apparatus information management unit 301, the communication control management unit 307 performs communication with the wireless controller 214 via the wireless controller I/F unit 311. Then, the communication control management unit 307 sends a management transfer request for the information transmission control when performing notifications for all subsequent apparatus management information communications, along with notifying the wireless controller 214 of the shutdown state of the main power source. In addition, the communication control management unit 307 transmits the apparatus management information to the wireless controller 214.

In S509, when the notification of the shutdown state and the management transfer for the information transmission control to the wireless controller 214 are complete, the communication I/F determining unit 303 sends a shutdown permission notification to the power source control unit 306. Although in the present embodiment, the communication I/F determining unit 303 sends the shutdown permission notification, the present invention is not limited thereto. For example, the power source control unit 306 may periodically send inquiries to the communication I/F determining unit 303, and the communication I/F determining unit 303 may respond to these inquiries by rejecting or authorizing the shutdown. After this, the processing in FIG. 6 is completed.

By the above processing, before the shutdown is completed, it is possible to reliably transfer the management of the information transmission control after shutdown to the wireless controller 214.

FIG. 7 is a flowchart showing an example of the initialization processing that is performed by the control unit 200 when the power source for the MFP 100 is turned on.

In S510, when the power source control unit 306 detects that the power source of the MFP 100 has been turned on by the operator via the power source control 216, it sends a main power source turned on notification to the communication I/F determining unit 303.

When the communication I/F determining unit 303 receives a main power source turned on notification, it sends a main power source turned on notification to the wireless controller 214 via the apparatus information management unit 301, the communication control management unit 307, and the wireless controller I/F unit 311. After this, the processing in FIG. 7 is completed.

By notifying the communication I/F determining unit 303 that the main power source of the MFP 100 has been turned on, the communication I/F determining unit 303 transitions the information transmission control from the control for the turned-off state to the control for the main power source turned-on state (regular power mode). It is thereby possible for the communication I/F determining unit 303 to perform transmission by selecting the interface for the information transmission control, which only the wireless controller 214 handles in the turned-off state, as in S504 to S506 of FIG. 6, in the main power source turned-on state.

Note that although in the present embodiment the wireless controller 214 is notified when the main power source is turned on, the present invention is not limited thereto. For example, the processing may also be made so that when the communication I/F determining unit 303 receives the main power source turned on notification, it requests that the wireless controller 214 suspend the information transmission control and change the control subject.

Figure 8:
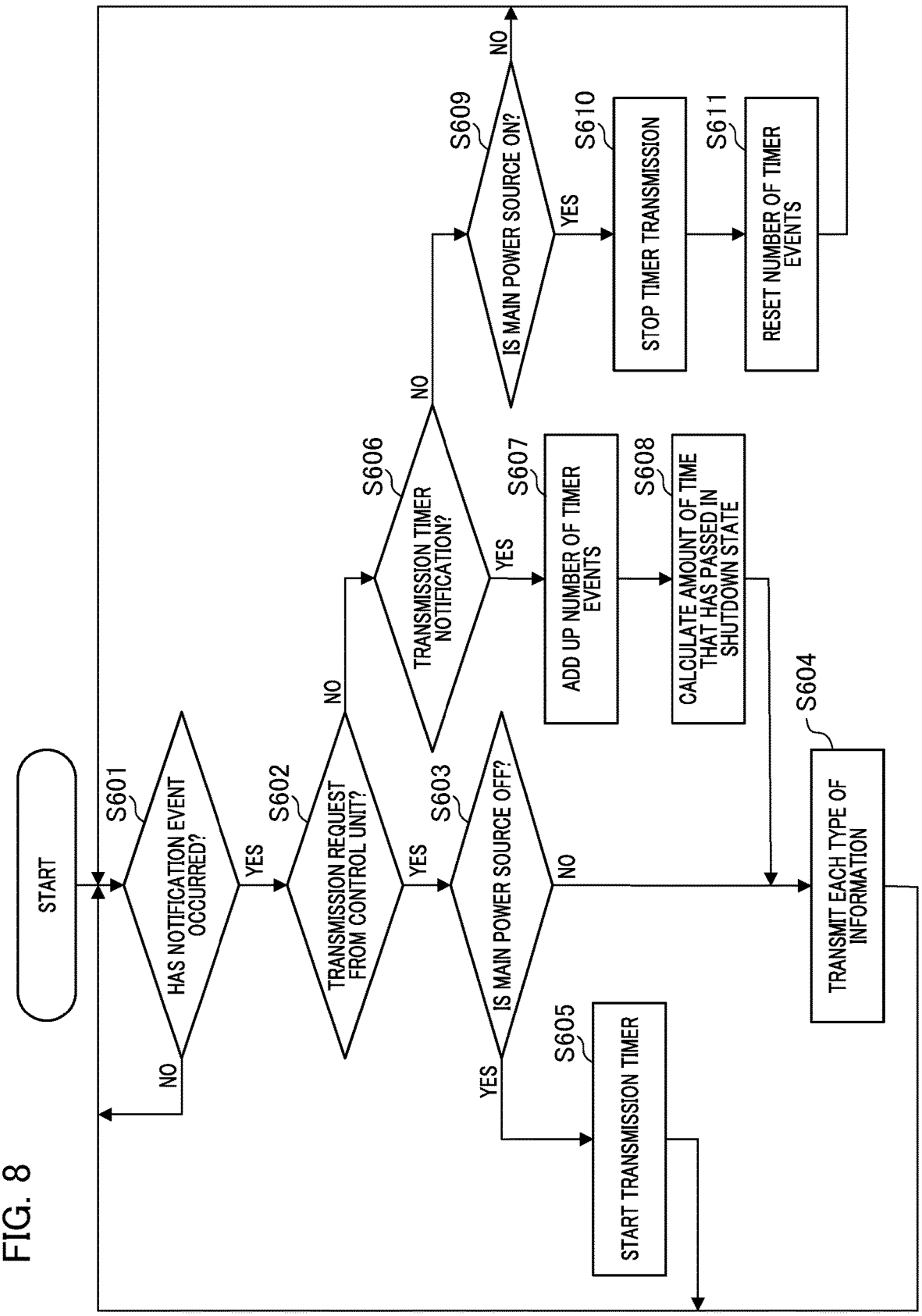
FIG. 8 is a flowchart showing an example of the operations of the wireless controller.

FIG. 8 is a flowchart showing an example of the operations of the wireless controller 214 when it has received each type of command and notification from the control unit 200. Each operation (step) that is shown in the flowchart in FIG. 8 is realized by the CPU 221 of the wireless controller 214 calling and executing a program. Note that it is assumed that the transmission and reception processing and the like of the data is realized in cooperation with each unit. In addition, in order to make the subjects of the processing clear, explanations will be given using the software modules that are executed by the CPU 221 as the subjects.

In S601, the apparatus information management unit 401 determines whether a notification event from the control unit 200 has occurred via the transmission and reception I/F unit 400. The above notification event includes each type of command, notification, or timer event, which will be described below, from the control unit 200. In the case in which a notification event has occurred, the processing moves to S602. In contrast, in the case in which a notification event has not occurred, the apparatus information management unit 401 waits until a notification event occurs.

In S602, the apparatus information management unit 401 determines whether the event that has occurred was a transmission request from the control unit 200. The above transmission request includes transmission commands for each type of apparatus management information such as counters or the like, and management transfer requests for the information transmission control. In the case in which the event was a transmission request from the control unit 200, the processing moves to S603, and in the case in which it was not a transmission request from the control unit 200, the processing moves to S606.

In S603, the apparatus information management unit 401 determines whether or not the main power source of the MFP 100 is in a shutdown state. In the case in which the main power source is in a shutdown state, it is assumed that the transmission request is a management transfer request for the information transmission control, and the processing moves to S605. In contrast, in the case in which the main power source is in a turned-on state, it is assumed that the transmission request is a transmission command for each type of apparatus management information, and the processing moves to S604.

S604 corresponds to the case in which the wireless controller 214 has been chosen as the communication interface by the communication I/F determining unit 303 when the MFP 100 is in regular power mode (the case of S504 to S506 in FIG. 6).

In S604, the apparatus information management unit 401 sends a command to the wide area wireless control unit 403 to transmit each type of apparatus management information that has been received from the control unit 200 to the management server 111 through the cloud server 110. When the wide area wireless control unit 403 receives the above command, it generates LPWA standard communication data including each type of apparatus management information, and wirelessly transmits the communication data to the base station 107 via the wide area wireless driver 404. Then the processing returns to S601.

S605 corresponds to the case in which the management of the information transmission control has been transferred to the wireless controller 214 due to a shutdown (the case of S507 and S508 in FIG. 6).

In S605, the apparatus information management unit 401 commands the timer management unit 402 to set a transmission timer in order to start the processing for the next transmission to the management server 111.

The timer management unit 402 receives the timer set command, generates a transmission timer, and starts the timer counter. In addition, the apparatus information management unit 401 saves each type of apparatus management information that is included in the transmission request received from the control unit 200 on the RAM 222. The apparatus management information that has been saved on the RAM 222 is used the next time that a timer event occurs. Then, the processing returns to S601.

S606 corresponds to the case in which the event that has occurred does not correspond to a transmission request from the control unit 200. In S606, the apparatus information management unit 401 determines whether or not the event that has occurred is a notification of the transmission timer (timer event) that was set in S605. In the case in which it is a timer event, the processing moves to S607. In contrast, in the case in which it is not a timer event, the processing moves to S609.

In S607, the apparatus information management unit 401 adds up the number of timer events that have occurred since the MFP 100 has been in a shutdown state and saves this on the RAM 222.

In S608, the apparatus information management unit 401 calculates the amount of time that has passed since shutdown based on the number of timer events that are saved in S607.

After the processing in S608, the apparatus information management unit moves the processing to S604. The wide area wireless control unit 403 thereby generates LPWA standard communication data including each type of apparatus management information according to the timer events, and wirelessly transmits the communication data to the base station 107 via the wide area wireless driver 404.

In this context, in the case in which the apparatus management information at a timer event is transmitted, the apparatus information management unit 401 sends a command to add the time that has passed since the shutdown that was calculated in S610 to the apparatus management information and transmit it. The management server 111 side is able to grasp the amount of time that has passed since the shutdown state of the MFP 100 began by the amount of time that has passed since shutdown being transmitted as apparatus management information. Thereby, in the case in which, for example, the shutdown state continues for a fixed period, the manager of the management server 111 is thereby able to contact the user in order to provide maintenance services without waiting for the user of the MFP 100 to contact them.

Note that in the present embodiment, the transmission timer for the next transmission in the shutdown state is a periodic timer. However, in the case in which the interval for the next transmission is altered, a transmission timer that specifies the interval for the next transmission after the transmission command in S604 may also be initialized.

S609 corresponds to the case in which the event that has occurred does not correspond to either a transmission request or a timer event from the control unit 200. In S609, the apparatus information management unit 401 determines whether or not the event that has occurred is a notification that the main power source has been turned on. In the case in which it is a notification that the main power source has been turned on, the processing moves to S610. In contrast, in the case in which it is not a notification that the main power source has been turned on, the apparatus information management unit 401 determines that the event that has occurred is an event that normally cannot occur, the event that has occurred is discarded, and the processing returns to S601.

In S610, the apparatus information management unit 401 sends a command to the timer management unit 402 to stop the transmission timer according to the notification that the main power source has been turned on. The timer management unit 402 receives the above command, then stops and releases the set transmission timer. In S611, the apparatus information management unit 401 initializes the number of times that timer events have occurred that was saved in S607. Then, the processing returns to S601.

Note that although in the present embodiment, the wireless controller 214 is notified by the communication I/F determining unit 303 that the main power source of the MFP 100 has been shut down, the present invention is not limited thereto. For example, the apparatus information management unit 401 may detect the shutdown by periodically sending inquiries about the state of the main power source to the control unit 200.

As has been described above, the MFP 100 in the first embodiment externally transmits apparatus management information via a wired LAN or a wireless LAN when the MFP 100 is in regular power mode, in which it functions using the main power source 215, which receives a power supply from an external commercial power source. In contrast, when the power supply from the main power source 215 is stopped, the MFP 100 performs control such that after the power supply from this source has stopped, power is supplied to the wireless controller 214 by the power source 225, which is internal to the apparatus, and apparatus management information is externally transmitted via the wireless controller 214.

The MFP 100 is thereby able to notify the apparatus management server 111 of the apparatus management information that is used in the management of the own apparatus even in a state in which the power supply has been turned off. In addition, the apparatus management server 111 is able to acquire apparatus management information even when the MFP 100 is in a state in which the power supply has been turned off, and therefore, the service provider is able to plan the services that should be performed on the MFP 100, and effectively carry out these services.

Second Embodiment

Figure 9:
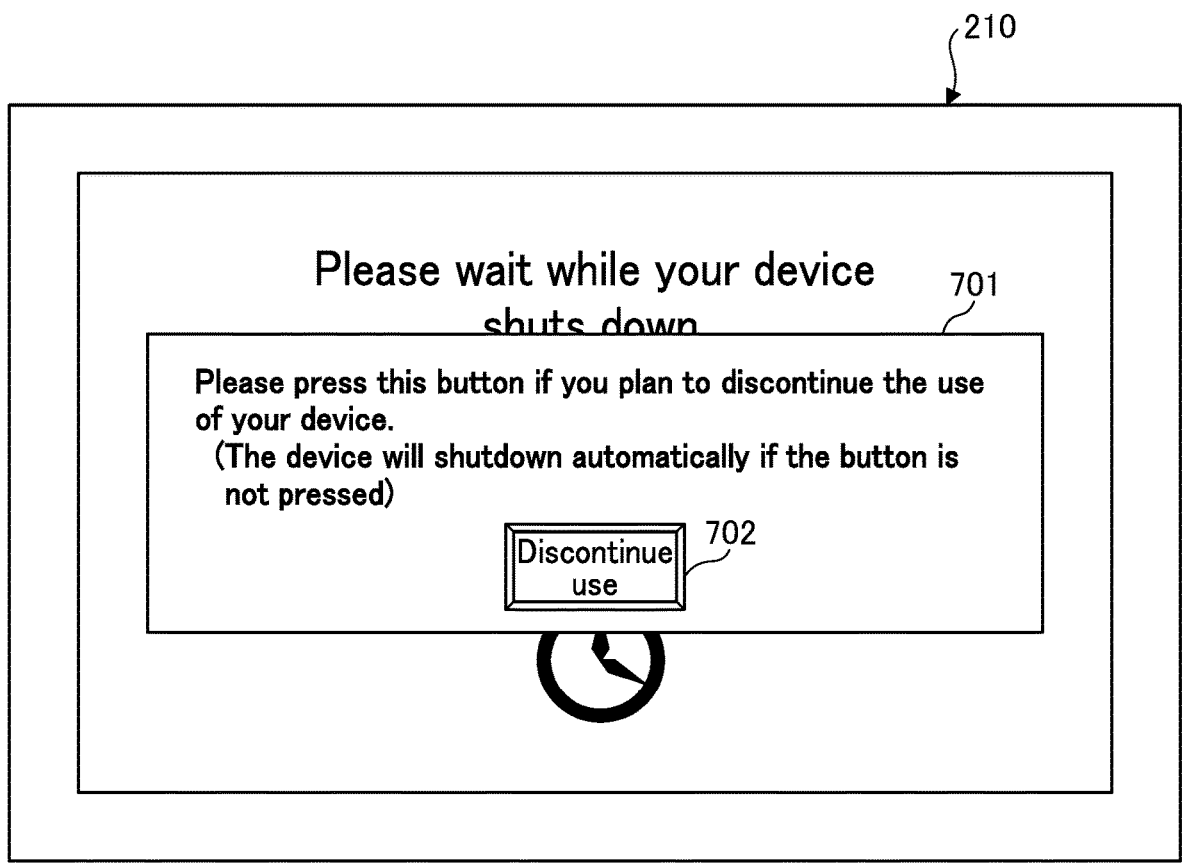
FIG. 9 is a diagram showing an example of a screen that is displayed on the operating unit when the shutdown processing starts in the second embodiment.

Below, a second embodiment will be described with reference to FIG. 9. FIG. 9 is a diagram showing an example of a screen that is displayed on the operating unit 210 when the shutdown processing starts. Note that the configuration of the apparatus in the second embodiment is the same as that of the first embodiment, and therefore, all redundant explanations will be omitted.

In the case in which the MFP 100 has been shut down by the user, the operation control unit 304 displays a screen indicating that shutdown processing is being performed, as is shown in FIG. 9, on the operating unit 210. The screen in FIG. 9 includes a display 701, which confirms whether or not the shutdown is due to the operation of the MFP 100 being discontinued (for example, due to disposal, replacement, or the like), and a button 702 to be pressed when the usage is to be discontinued.

Although in the second embodiment, the screen in FIG. 9 is displayed at the same time as the screen during shutdown, the present invention is not limited thereto. For example, the operation control unit 304 may be made to display a screen that allows for the selection of discontinuing usage in the same way as that in FIG. 9 on a service management screen that is used only by a service man who performs maintenance services.

In the state in which the screen in FIG. 9 is displayed, when the button 702 is operated by the user or a serviceman of the MFP 100, the operation control unit 304 sends a usage discontinued notification to the communication I/F determining unit 303 via the apparatus settings management unit 305.

Upon receiving the above-described usage discontinued notification, the communication I/F determining unit 303 sends a usage discontinued notification to the wireless controller 214 using the processing in FIG. 6. Then, the processing of S601, S602, S603, and S605 in FIG. 8 are executed in order in the wireless controller 214. The apparatus information management unit 401 thereby commands the timer management unit 402 to set a transmission timer in order to start the next transmission processing in the shutdown state.

Subsequently, the processing of S601, S602, S606 to S608, and S604 are executed in order in the wireless controller 214 due to the timer event from the timer management unit 402. The apparatus information management unit 401 thereby commands the wide area wireless control unit 403 to transmit a usage discontinued notification to the management server 111. Upon receiving the above command, the wide area wireless control unit 403 generates LPWA standard communication data including the usage discontinued notification, and wirelessly transmits the communication data to the base station 107 via the wide area wireless driver 404.

The MFP 100 in the second embodiment is able to transmit apparatus management information including usage discontinued notifications from the wireless controller. In addition, the apparatus management server 111 is able to acquire usage discontinued notifications even when the MFP 100 is in a state in which the power has been turned off, and it is therefore possible for the service provider to rapidly perform collection services and consult with the user about replacements after the usage has been discontinued.

OTHER EMBODIMENTS

In the above-described Embodiments, an example of a system has been explained in which the management target is an image forming apparatus. However, the information processing apparatus that is the management target of the present invention may be any network apparatus that is able to use a cloud service, and is not limited to image forming apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-082336, filed May 14, 2021 which is hereby incorporated by reference herein in its entirety.

What is claimed is:

1. An information processing apparatus configured to transmit apparatus management information used in management of the information processing apparatus to an external server, comprising:
   a first communication interface;
   a second communication interface that is different from the first communication interface;
   a memory storing instructions; and
   a processor executing the stored instructions and causing the information processing apparatus to:
      externally transmit the apparatus management information via the first communication interface when in a regular power mode in which the information processing apparatus operates using a first power source configured to receive a power supply from outside of the apparatus; and
      perform, in a case that where power supply to the information processing apparatus by the first power source has been stopped upon receiving a shutdown operation for the first power source, control such that power is supplied to the second communication interface by a second power source inside the apparatus after the power supply has stopped, and the apparatus management information is externally transmitted via the second communication interface.

2. The information processing apparatus according to claim 1, wherein the apparatus management information includes at least one of information indicating a state of the information processing apparatus, information indicating an operation history of the information processing apparatus, and information indicating a residual amount of consumable products used by the information processing apparatus.

3. The information processing apparatus according to claim 1, wherein
the first communication interface performs communication conforming to IEEE802.11 standards or Ethernet standards, and
the second communication interface performs communication conforming to LPWA standards.

4. The information processing apparatus according to claim 3, wherein the first communication interface transmits the apparatus management information to the server via the internet in the regular power mode.

5. The information processing apparatus according to claim 1, wherein the processor transmits the apparatus management information indicating a state of the information processing apparatus before the shutdown via the second communication interface by the control.

6. The information processing apparatus according to claim 5, wherein the processor transmits the apparatus management information including information indicating an amount of time passed since the shutdown.

7. The information processing apparatus according to claim 1, wherein the processor switches the power supply source for the second communication interface from the first power source to the second power source when the shutdown operation is received.

8. The information processing apparatus according to claim 7, wherein the first power source receives a power supply from a commercial power source by a cable, and the second communication interface is able to externally transmit the apparatus management information in a state in which the first power source is not connected to the commercial power source by the cable.

9. The information processing apparatus according to claim 1, wherein the processor transmits the apparatus management information including information indicating that the usage of the information processing apparatus has been discontinued when an input is received that confirms that usage of the information processing apparatus has been discontinued.

10. A method for an information processing apparatus configured to transmit apparatus management information used to manage the information processing apparatus to an external server, provided with a first communication interface, and a second communication interface that is different from the first communication interface, the method comprising:
externally transmitting the apparatus management information via the first communication interface when in a regular power mode in which the information processing apparatus operates using a first power source configured to receive a power supply from outside of the apparatus; and
performing, in a case where power supply to the information processing apparatus by the first power source has been stopped upon receiving a shutdown operation for the first power source, control such that power is supplied to the second communication interface by a second power source inside the apparatus after the power supply has stopped, and the apparatus management information is externally transmitted via the second communication interface.

11. A non-transitory storage medium configured to store a computer program for a method for an information processing apparatus configured to transmit apparatus management information used in the management of the information processing apparatus to an external server, provided with a first communication interface and a second communication interface that is different from the first communication interface, the method comprising:
externally transmitting the apparatus management information via the first communication interface when in a regular power mode in which the information processing apparatus operates using a first power source configured to receive a power supply from outside of the apparatus; and
performing, in a case where power supply to the information processing apparatus by the first power source has been stopped upon receiving a shutdown operation for the first power source, control such that power is supplied to the second communication interface by a second power source inside the apparatus after the power supply has stopped, and the apparatus management information is externally transmitted via the second communication interface.

* * * * *